J. W. HASBURG.
MACHINE FOR SPREADING OR FORMING PAINT.
APPLICATION FILED DEC. 4, 1911.
1,089,923.
Patented Mar. 10, 1914.
2 SHEETS—SHEET 2.
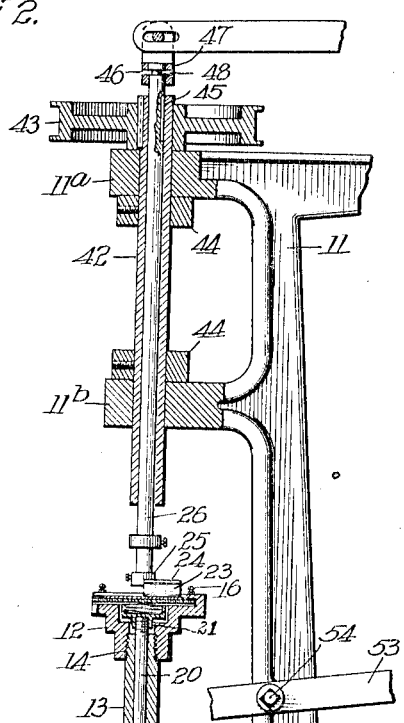
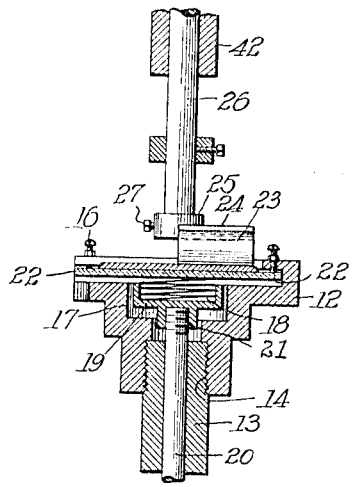
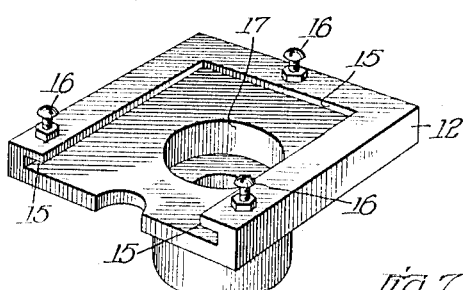
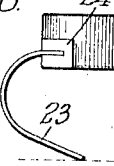
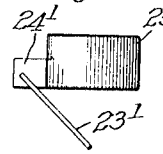
Witnesses:
Robert H. Weir
Leo J. DuMais
Inventor
John W. Hasburg
Jones Bain May
Attys
COLUMBIA PLANOGRAPH CO., WASHINGTON, D. C.

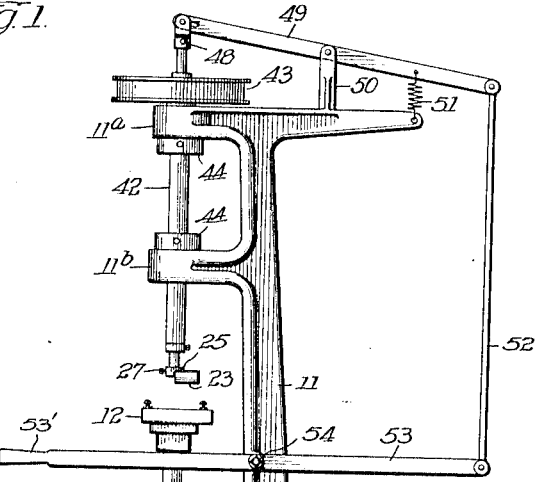
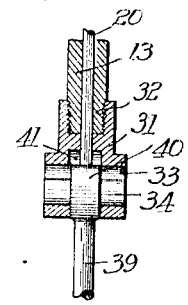
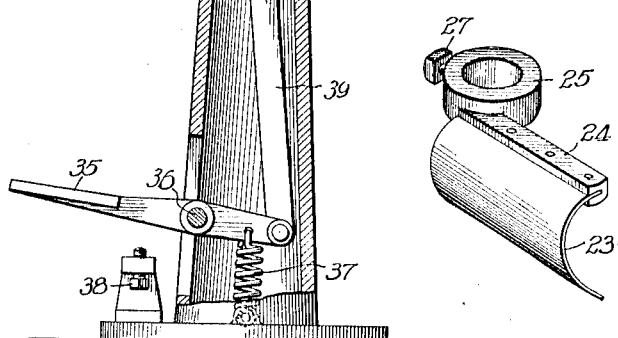

UNITED STATES PATENT OFFICE.

JOHN W. HASBURG, OF CHICAGO, ILLINOIS.

MACHINE FOR SPREADING OR FORMING PAINT.

1,089,923.  Specification of Letters Patent.  Patented Mar. 10, 1914.

Application filed December 4, 1911. Serial No. 663,778.

*To all whom it may concern:*

Be it known that I, JOHN W. HASBURG, a citizen of the United States, residing at Chicago, in the county of Cook and State of Illinois, have invented certain new and useful Improvements in Machines for Spreading or Forming Paint, of which the following is a specification.

My invention relates to improvements in paint spreading or forming machines.

In the manufacture of gold paint for ornamental decoration of ceramic and glass ware it is my usual custom to prepare such material, for shipment and use, on a glass palette made of a piece of ordinary window glass approximately three inches square, and then cover the paint by sealing to the surface of the plate a cup-shape closure having surrounding flat edges to provide a substantially air tight seal to protect the paint against the deleterious influence of the atmosphere, and to protect it against contamination by particles of dust. The paint is very valuable, and it must therefore be handled with care, and as it is used by artists its presentable appearance must be pleasing and attractive. The paint is deposited upon the glass palette and it is sufficiently mastic in character as to adhere thereto. It is spread out on the palette into a disk-like mass. It is commercially necessary that the paint mass, in the various packages, shall be uniform in size and thickness so as to avoid the appearance of unequal quantities therein.

My present invention has for its object to provide a machine whereby paint may be quickly and conveniently spread upon its palette in a uniform mass of artistic appearance, and whereby the working surface of the glass is presented always in a plane at ninety degrees from the axis of the rotating, paint spreading tool.

Other and further objects of my invention will become readily apparent to persons skilled in the art from a consideration of the following description taken in conjunction with the drawings, wherein:

Figure 1 is an elevation of the spreading machine, partly in section; Fig. 2 is an enlarged fragment of the machine showing parts of the upper portion in section; Fig. 3 is a further enlarged, broken away detail in section; Fig. 4 is an isometric view of the palette holder; Fig. 5 is a side view of the spreading blade in position of rest; Fig. 6 is a similar view of same in working position; Fig. 7 is a modification, showing a different form of blade that may be used; Fig. 8 is a perspective view of the blade; Fig. 9 is an enlarged section, taken on line 9—9 of Fig. 1.

In all of the views the same reference characters indicate similar parts.

In my co-pending application for forming paint and similar materials, Serial #621,048, filed April 14th, 1911, I have shown and described a frame and certain parts thereof similar in general character to the machine illustrated in this application.

My present invention has especial reference to means for presenting the glass palette to the spreading tool, and to a peculiar shape tool, and manual means for moving same in a vertical plane with reference to the palette.

On the base part 10 a frame 11 is superposed. A plate holder 12 is mounted for vertical movement on a tubular support, or shaft 13, conveniently by screw threaded engagement, as at 14. The plate holder 12 has overhanging ledges 15 on three of its sides, under which ledge the plate or palette is inserted from the open side. Three contact screws 16 take through the respective ledges and are vertically adjustable therein. They afford stops against which the upper surface of the palette contacts at the time when it is presented to the spreading tool. The plate holder has a central recess 17 within which an open, helical cushion spring 18 normally rests in a holder 19. The spring holder is connected to a vertically movable stem 20, as by screw threaded engagement 21. When the stem 20 is raised, as in Fig. 3, the upper surface of the cushion spring is brought into contact with the under surface of the palette 22, thereby to raise the palette until its upper surface is brought into contact with the three adjustable screws 16, so that by this means the paint-receiving surface of the palette is always presented to the spreading tool or blade in a plane at ninety degrees from the axis of said tool, thereby to insure uniformity of thickness of paint upon the palette. The cushion 18 is of sufficient strength to maintain the palette at all times in raised position, and instead of being a spring, as shown, it can as well be made of any yielding material, such as sponge rubber, or the like.

A spreading tool comprising a thin blade 23 is preferably bent upon itself, as shown in Figs. 5 and 6, to give it its preferred resilience, having its upper edge secured to an arm 24 which in turn is secured to a collar 25. The collar 25 is removably secured to a vertically movable, rotatable spindle 26, as by a set screw 27, or the like. The blade 23 terminates at the vertical axis of the spindle 26. Now it is evident that, if the blade 23 be rotated above the palette 22, the blade will sweep over the presented surface of the palette in a precise parallel plane regardless of the variation in the thickness of the glass palettes or the lack of uniformity of thickness in any given palette, and thereby the formed paint deposit may be made uniform in thickness and size.

The forming blade and palette are moved into operative positions by the following means: In the base part 10 is a vertically movable tube 13 which carries on its upper end the palette holder 12 and provided with a feather 28 which moves freely in a spline 29 made into the base part 10 to prevent rotation of the tube. A collar 30 affords a stop to limit the downward movement of the tube 13. To the lower end of the tube 13 there is connected a bearing casting 31, secured thereto by screw-threaded connection, as at 32, or otherwise. The casting 31 has a transversely disposed bore 33 which has a larger vertical dimension than horizontal dimension, to permit lost motion, vertical movement for the pin 34 therein. A foot treadle 35 is pivoted to the base, as at 36, and is held normally raised, as by a spring 37. An adjustable stop 38 provides a means for terminating the upper movement of the tube 13 to which the lever 35 is connected, as by a connecting rod 39. The pin 34 retains the connecting rod in association with the tube 34. The rod 20 directly carries the resilient palette supporting means 18—19 at its upper end, its lower end rests upon the connecting rod bearing, as at 40. A recess 41 permits limited vertical movement of the connecting rod with reference to the bearing casting 31. From this arrangement it will be observed that, when a palette is inserted in the holder 12, as shown in Fig. 3, and the treadle 35 is depressed, the initial movement of the treadle raises the connecting rod 39 in the bearing 31 and thereby the rod 20 is raised to a limited extent but sufficient to bring the cushion spring 18 into contact with the lower surface of the palette and raise it until its top surface is brought into contact with the positioning screws 16, and further movement of the treadle 35, until it strikes the stop 38, raises the tube 13 and plate holder 12 to a predetermined height in position for application of the spreading tool 23 to the paint deposit then upon the palette.

Means for manipulating the spreading blade, 23, comprises a rotatable tube 42, vertically supported in bearings 11ª, 11ᵇ of the frame 11. To the upper end thereof a driving pulley 43 is secured. Collars 44 prevent vertical movement of said tube. A centrally disposed, vertically movable spindle 26 passes through the tube 42 and is rotatably driven thereby by feather and spline connection 45. The upper end of the spindle 26 is circumferentially grooved, as at 46, for a loose fitting cap 47 that carries radially deposited pins, 48, for engagement in said groove. To the upper end of the cap 47 a lever 49 has pin and slot connection to provide for slight relative lateral motion therebetween, as when the spindle is raised and lowered by the lever. The lever has pivotal bearing support in the standard 50 and is yieldingly held normally in position shown in Fig. 1 by a spring 51. A connecting rod 52 connects the lever 49 with the hand lever 53, the latter being pivoted to the frame 11, as at 54. Now when the handle 53′ is depressed, by means of the connecting mechanism described, the tool 23 is likewise depressed. Normally the tool 23 has its trailing working edge substantially in position shown in Fig. 5 but upon further pressure being applied to the handle 53′ it may assume the position shown in Fig. 6, with its trailing working edge substantially in a radial line, or any intermediate position, depending upon the degree of pressure applied thereto.

The blade 23 sweeps over the upper surface of the palette and spreads the deposited paint thereon into a disk-like shape of uniform thickness and of diameter depending upon the quantity of paint and the pressure applied to the tool. The skill of the operator will determine the character of the fashioned deposit. If it is desirable to produce ornamental designs in the fashioned paint deposit, the working edge of the tool 23 may be serrated, or notched, to produce the desired configuration.

While I have herein described with some particularity a single embodiment of my invention, it is evident that changes may be made therein within the scope of the claims, without departing therefrom.

Having described my invention, what I claim is:

1. In a machine of the class described, a movable forming tool, a palette-holding means movable toward said tool, means carried by said palette-holding means for engaging with the upper face of the palette to hold the same with its confronting surface fixed parallel with a plane described by the path of the tool, and movable palette-engaging means beneath the palette to hold the palette up against said upper palette-engaging means, whereby palettes of varying thicknesses have their upper surfaces similarly disposed with respect to said tool.

2. A paint-deposit shaping machine comprising a forming tool, a palette receiving means, contact points thereon for positioning the upper surface of the palette with respect to the tool, means for maintaining a palette in contact with said points, and means for moving the tool to fashion a paint deposit on said palette.

3. A paint-deposit shaping machine comprising a forming tool, a supporting axis therefor, means for relatively rotating said tool with respect to a palette, and palette-positioning means adapted and arranged to automatically adjust and present the deposit-receiving surface thereof fixed in a plane parallel with the path of the tool.

4. In a paint-deposit shaping machine a forming tool, comprising a radially disposed, resilient blade, means for rotating said blade, means for axially moving said blade, a parallel receiving means, and means for positioning a flat palette with its presented surface parallel with the path of said tool.

5. In a paint-deposit shaping machine, a substantially radially disposed, transversely resilient blade for forming paint on a palette, and means for rotating said blade.

6. In a paint-deposit shaping machine, a relatively long, transversely resilient blade, having its working edge in a substantially radial position for forming paint on a palette, palette receiving means, and means for relatively rotating said blade and palette receiving means.

7. A machine of the type described, in combination with a rotating tool, a palette receiving support leveling stop thereon, yielding means for maintaining a palette in contact with said stops, and means for relatively moving said palette and tool toward and from each other.

8. In a machine of the type described, the combination of a relatively rotatable tool and palette-receiving support, said support comprising a movable member having parts for coaction with the upper surface of the palette and yielding means movable to coact with the lower surface of the palette, and a part having operative connection with both said movable member and said yielding means of the support.

9. In a machine of the type described, the combination of a relatively rotatable tool and palette-receiving support, said support comprising a movable member having parts for coaction with the upper surface of the palette and yielding means movable to coact with the lower surface of the palette, and a part having direct connection to said yielding means and a lost-motion connection to said movable member.

10. In a machine of the type described, the combination of a relatively rotatable tool, palette-positioning means for coaction with the upper surface of a palette, and yielding means movable to coact with the lower surface of the palette to raise the same into contact with the positioning means, and means to move said yielding means.

11. In a machine of the type described, the combination of a palette holder having parts for coaction with the upper surface of a palette, said member constituting a means for fixing the upper surface of said palette in predetermined position with respect to a tool, means carried by the palette holder movable to coact with the lower surface of the palette, and a rotatable tool adapted for rotation above said palette a certain distance from said upper surface of the palette so determined by said member.

In testimony whereof I hereunto set my hand in the presence of two witnesses.

JOHN W. HASBURG.

In the presence of—
 W. LINN ALLEN,
 MARY F. ALLEN.

---

Copies of this patent may be obtained for five cents each, by addressing the "Commissioner of Patents, Washington, D. C."